United States Patent [19]

Ideno et al.

[11] Patent Number: 4,511,095
[45] Date of Patent: Apr. 16, 1985

[54] METHOD AND APPARATUS FOR WINDING GLASS FIBERS

[75] Inventors: Eizo Ideno; Shinichi Fukushi; Masahiko Tai, all of Kyoto; Koji Nakazawa; Toshihito Fujita, both of Fukushima, all of Japan

[73] Assignees: Shimadzu Corporation; Nitto Boseki Co., Ltd., both of Japan

[21] Appl. No.: 468,550

[22] Filed: Feb. 22, 1983

[30] Foreign Application Priority Data

| Feb. 27, 1982 | [JP] | Japan | 57-31392 |
| Feb. 27, 1982 | [JP] | Japan | 57-31393 |
| Jul. 15, 1982 | [JP] | Japan | 57-122148 |
| Jul. 27, 1982 | [JP] | Japan | 57-129695 |
| Aug. 7, 1982 | [JP] | Japan | 57-136825 |
| Aug. 14, 1982 | [JP] | Japan | 57-140490 |

[51] Int. Cl.³ ............... B65H 54/02; B65H 67/04
[52] U.S. Cl. ......................... 242/18 G; 83/347; 242/18 A; 242/35.5 A
[58] Field of Search ............ 242/18 G, 18 A, 18 PW, 242/18 R, 25 A, 35.5 A; 83/346, 347

[56] References Cited

U.S. PATENT DOCUMENTS

| 2,255,426 | 9/1941 | Lamesch | 242/18 G X |
| 2,719,336 | 10/1955 | Stotler | 83/347 X |
| 3,508,461 | 4/1970 | Stream | 83/347 X |
| 3,666,431 | 5/1972 | Oswald | 242/18 G X |
| 3,884,425 | 5/1975 | Sartori | 242/18 A X |
| 3,901,456 | 8/1975 | Pradier | 242/18 A |
| 3,992,967 | 11/1976 | Fram | 83/347 |
| 4,040,572 | 8/1977 | Melan et al. | 242/18 G X |
| 4,230,284 | 10/1980 | Cunningham et al. | 242/18 G |

FOREIGN PATENT DOCUMENTS 0025340 3/1981 European Pat. Off. .......... 242/18 G

Primary Examiner—Stanley N. Gilreath
Attorney, Agent, or Firm—Gerald J. Ferguson, Jr.; Joseph J. Baker

[57] ABSTRACT

An apparatus for winding strand of glass fiber filaments is disclosed. The apparatus comprises at least one takeup collet on which a strand of glass fiber filaments is wound, a guiding mechanism for guiding an end portion of the strand which has started being drawn off from a spinning bushing to a predetermined position below the spinning bushing on a stream of a water, and an auxiliary winder mechanism rotatable for catching and winding the guided end portion of the strand. The auxiliary winder being moved toward said takeup collet when the end portion of the strand is under a condition capable of being transferred onto the takeup collet for bringing the strand into contact with the takeup collet within a winding zone of the takeup collet. An associated method therefor is also disclosed.

18 Claims, 19 Drawing Figures

FIG. 5B Ⓐ
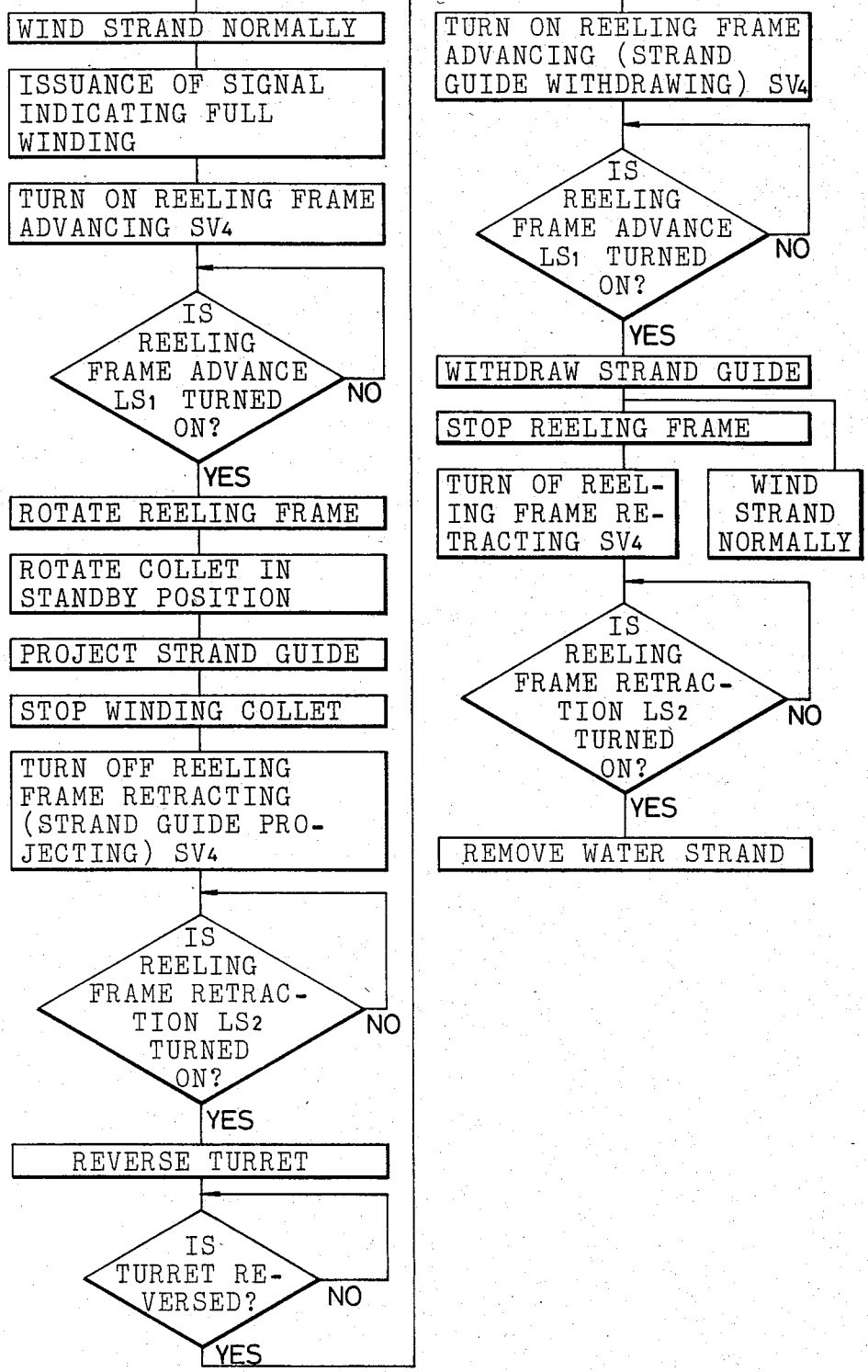

FIG. 14
FIG. 15
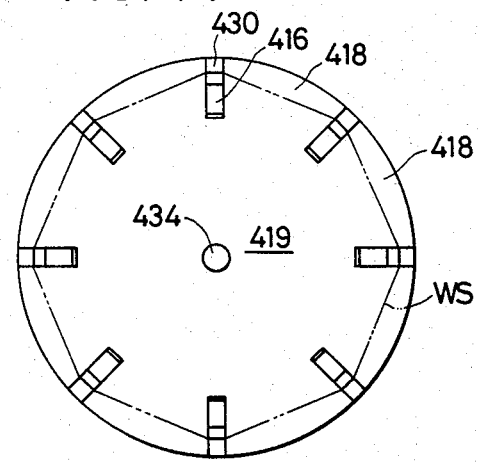
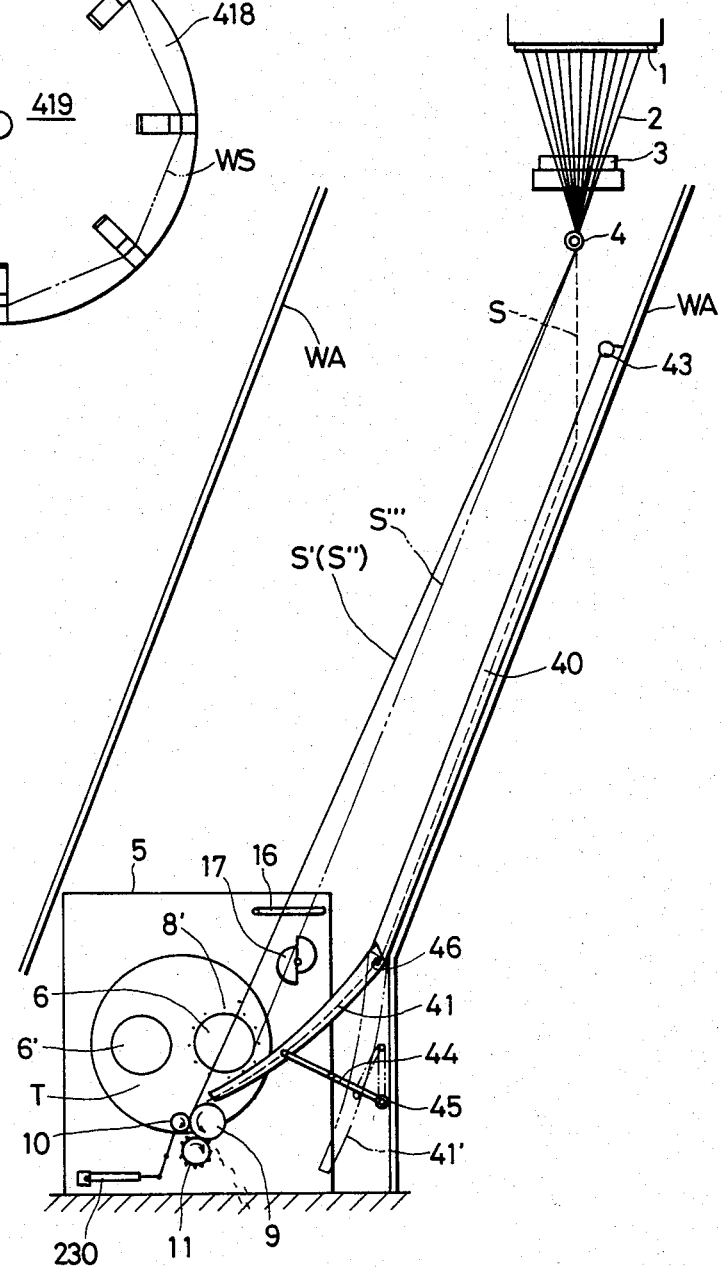

METHOD AND APPARATUS FOR WINDING GLASS FIBERS

BACKGROUND OF THE INVENTION

The present invention relates to a method and an apparatus for winding a strand of glass fiber filaments onto a takeup collet in a glass fiber takeup machine when the glass fiber filaments are drawn off from nozzles.

When a strand of glass fiber filaments starts being drawn in a glass fiber takeup machine, it has been customary practice to wind the strand of glass fiber filaments on a takeup collet by manually catching the leading end of the strand and winding the same around the collet being rotated while tensioning the strand at the same time. More specifically, in drawing off glass fiber filaments, melted glass is drawn as a number of fiber filaments from a bushing, and wound on the collet in the takeup machine after having passed through an application roller and a gathering roller. The bushing and the takeup machine are spaced widely apart from each other; usually, the bushing is located on the second floor of a building, while the takeup machine is installed on the first floor. The conventional takeup process has required a cooperation between two workers, one on the second floor for drawing the glass fiber filaments off from the bushing, and the other on the first floor for catching and winding the end of the glass fiber filaments onto the collet. The conventional method involves manual work, demands skilled operation, places a large amount of burden on the workers, and is difficult to achieve a desired degree of safety during operation.

On the other hand, in general, elongated glass fibers are normally fabricated by drawing a multiplicity of filaments from a bushing having a number of nozzles, applying sizing agents to the filaments, and collecting the filaments as one or more strands. The strand is then wound for a constant quantity at a fixed rate in the range of from 1,500 to 5,000 m/min. onto the periphery of the collet which rotates a few thousand revolutions per minute so that the strand is given a predetermined degree of elongation and composed of a few hundred to thousand filaments gathered each of a diameter ranging from 3 to 20 microns.

A full bobbin on which the strand is wound in a given quantity is removed from the collet, and then an empty bobbin of paper or film is fitted onto the collet for winding the strand thereon, an operation which is effected intermittently, whereas the glass filaments flow out of the bushing uninterruptedly. Various means have been proposed and put to use which include a rotatable table or a reciprocating table for displacing two or three collets alternately into a winding position, a full bobbin unloading position, and an empty bobbin loading position to effect quick bobbin switching and winding, while rejecting larger-diameter filament portions as waste strands which are produced when the speed of feed of the strand is increased to a constant winding speed after the strand has been stopped, or when the speed of feed is reduced from the constant winding speed. Expressed in another way, during initial and final periods of winding operation in which the strand is wound at a speed lower than the fixed rate, the filaments are larger in diameter than desired due to a reduced degree of elongation and hence should be rejected as waste strands. Various means have been put to use for removing such waste strands. The means for rejecting the waste strands normally include an auxiliary winder mounted on a free end of the takeup collet, or an auxiliary winder separate from the takeup collet so as to be independent of a normal winding section. The former means requires that the waste strand be cut off and removed when a fully wound bobbin is to be detached from the collet, resulting in an increased collet changing time. Both of the means need operator's manual intervention for initial strand winding and full collet interchange, and for this reason are subjected to less reliability and safety.

Also, the strand drawn off after accidentally broken off has conventionally been wound manually onto a collet, and then normally wound thereon via a traversing device when the collet reaches a predetermined speed of rotation thereof, with a strand portion which has been wound at a slow rate in an initial stage being cut off and removed as a waste strand of a different diameter.

Furthermore, the foregoing winding operation is intermittent in that when the strand is fully wound on a collet, the strand is moved outside of a winding zone, and another collet with an empty bobbin is brought into the winding position in which it starts rotating, with the strand that flows along a path outside of the winding zone being manually caught on and wound around the new collet.

Therefore, the strand portion that has been wound during a period other than the normal winding at the predetermined high speed is discharged as a waste strand. It is also important that the length of waste strand be reduced as much as possible for an improved efficiency of glass fiber spinning.

SUMMARY OF THE INVENTION

It is therefore a primary object of the present invention to provide a method of and an apparatus for winding a strand of glass fiber filaments while completely eliminating the above noted difficulties and disadvantages.

To achieve this and other objects, a glass fiber strand is caused to flow on a fluid stream to an auxiliary winder means disposed adjacent to a collet for being temporarily wound on the auxiliary winder means, and when the glass fiber strand wound on the auxiliary winder means grows to meet a condition that the fiber strand be wound on the collet, the fiber strand is transferred from the auxiliary winder means onto the collet being rotated so as to be wound therearound. An automatic apparatus for effecting such winding operation comprises a fluid guide device for guiding a fluid flow on which the fiber strand as drawn from the bushing flows, a pulling mechanism for gripping and pulling an end of the fiber strand beyond the position of the collet, and a mechanism for temporarily displacing the fiber strand which is kept taut between bushing and the pulling mechanism toward the auxiliary winder means to enable the latter to wind the fiber strand temporarily thereon.

According to the invention, the winder comprises an auxiliary winder disposed in coaxial relation to a collet and confronting an end of the collet, a mechanism for rotating the auxiliary winder, and a reciprocating mechanism for moving the auxiliary winder toward and away from the collet, the auxiliary winder having a plurality of pegs arranged in a circle concentric with the collet and having distal ends projecting toward the collet, the circle being larger in diameter than the collet so that the pegs will go over a portion of the periphery of the collet outside an interval which a fiber strand traverses while being wound onto the collet. Prior to winding the fiber strand onto the collet, the auxiliary winder is rotated to catch the fiber strand thereon and wind a length of the fiber strand temporarily and then the strand is moved toward the collet to allow the distal ends of the pegs to enter an area adjacent to and outside of the interval of traversing movement of the strand as the latter is wound onto the collet, thereby transferring the strand turns from around the pegs onto the collet to facilitate winding of the strand onto the collet.

In accordance with another aspect of invention, strand spinning and winding apparatus includes a strand guide projecting for guiding a strand of multiple glass fiber filaments which have been drawn off from an upper spinning bushing and given sizing agents applied for filament collection, toward a range outside of an operating interval of a traversing device positioned above a takeup collet and below the strand guide pull rollers for feeding the strand as guided by the projecting strand guide downwardly in front of a free end of the takeup collet, and an auxiliary winder reeling frame disposed in confronting relation to a front face of the free end of the takeup collet and rotatable coaxially with the takeup collet, the auxiliary winder reeling frame being axially movable and away from the takeup collet. When the auxiliary winder reeling frame is advanced from a retracted standby position into a path of pulling and feeding movement of the strand, the auxiliary winder reeling frame starts rotating about its own axis to reliably catch and wind the strand onto itself. As the speed of winding by the auxiliary winder reeling frame is increased up to a rate substantially equal to the speed of rotation of the takeup collet which has been rotated at a predetermined rate, the strand guide which has been in the projecting position and guided the strand is retracted out of the operating interval of the traversing device, thereby moving the strand from the auxiliary winder reeling frame onto the takeup collet, whereupon the auxiliary winder reeling frame is quickly braked against rotation. Therefore, the strand which is wound on the takeup collet is cut off under tension. The auxiliary winder reeling frame is now retracted. Thereafter, the strand is caused by axial movement of the traversing device to traverse the takeup collet so that the strand is wound onto the latter to form a predetermined amount of strand layers thereon. The strand which has been wound on the auxiliary winder reeling frame is pushed off the reeling frame for removal.

Two or three such takeup collets are mounted on a rotatable or reciprocable table and movable alternately into a winding position, a full bobbin unloading position, and an empty bobbin loading position in response to movement of the table, an arrangement which is per se the same as conventional constructions.

When the takeup collet is fully loaded with the strand, the auxiliary winder reeling frame is advanced from the standby position and rotated at substantially the same speed as that of rotation of the collet, whereupon the strand guide projects to a predetermined position to move the strand from the takeup collet onto the auxiliary winder reeling frame being rotated. Then, the auxiliary winder reeling frame starts winding the strand thereon. At this time, the takeup collet is quickly braked and stopped to cause the strand to be cut off between the takeup collet and the auxiliary winder reeling frame. The auxiliary winder reeling frame while winding the strand thereon is retracted to the standby position, and the strand guide further projects at the rate of retraction of the auxiliary winder reeling frame. The collet table is now rapidly moved to transfer the full collet to the bobbin unloading position and another collet with an empty bobbin mounted thereon to the winding position. During this time, the auxiliary winder reeling frame and the takeup collet rotate at a predetermined speed. The auxiliary winder reeling frame is then advanced and the strand guide is moved back to a predetermined position and then to an inoperative position for winding the strand on the collet. The waste strand on the auxiliary winder reeling frame is automatically removed therefrom. The fully loaded bobbin on the collet which is held at rest is dismounted therefrom, and then an empty bobbin is placed on the collet in preparation for a next winding cycle.

Therefore, the strand will continuously be wound unless the strand is broken off for some reasons. When the strand happens to be broken off due to variations in spinning conditions or other causes, the strand is caused by the pull rollers disposed below to pass along a given path extending through the projecting strand guide and in front of the front face of the distal end of the takeup collet, as described earlier, so that the strand will reliably be caught by the auxiliary winder reeling frame in order to be wound in the foregoing manner.

According to the invention, a waste strand wound in auxiliary winding operation is mechanically removed with safety and reliability and carry out automatically the process of spinning and winding glass fibers.

An auxiliary winder according to the invention comprises a winding frame composed of a plurality of spaced members defining a peripheral surface for winding a strand and a rotatable base supporting the spaced members, and a mechanism for displacing strand catchers extending outwardly from spaces between the members toward an end of the winding frame to cause waste strand layers wound on the winding frame to be discharged out of the latter and fall down.

According to the invention, there have been provided an auxiliary winder disposed in front of a free end of the collet and a strand pulling mechanism positioned downwardly of a space across which the auxiliary winder and the collet face each other for winding the strand stably and reliably onto the auxiliary winder, the auxiliary winder being actuatable to allow the strand to be wound smoothly and rapidly onto the collet which has quickly been speeded up to a predetermined speed of rotation in a short period of time.

Furthermore, according to the invention, filaments drawn off from a spinning bushing is brought into contact with sizing agent application roller and gathered by a gathering roller into a strand, which is guided to flow down a fluid flow passage toward a strand gripping portion of a strand pulling mechanism disposed below a collet. The strand at the time of starting the spinning thereof is therefore pulled taut between the gathering roller and the pulling mechanism without requiring manual intervention for being reliably wound on an auxiliary winder. The fluid flow passage has a strand receiver disposed below and adjacent to the gathering roller and a strand discharger positioned immediately above the strand gripping portion of the pulling mechanism. Where the flowing fluid is water, the fluid flow passage comprises a gutter having an open upper side extending throughout its entire length. Where the flowing fluid is air, the fluid flow passage comprises a tubular body 5 made of a resilient material such as rubber or synthetic resin and having a resiliently closable slit extending throughout its entire length. The strand can be fed along on the fluid flow generated from the strand receiver to the strand discharger of the fluid flow passage.

BRIEF DESCRIPTION OF THE DRAWINGS

In the accompanying drawings:

FIG. 14 is a front elevational view, as seen from the left, of the auxiliary winder;

FIG. 15 is a front elevational view of a strand guiding device of a sixth embodiment of the invention.

DESCRIPTION OF THE PREFERRED EMBODIMENT

The present invention will now be described with reference to the drawings.

Figure 1:
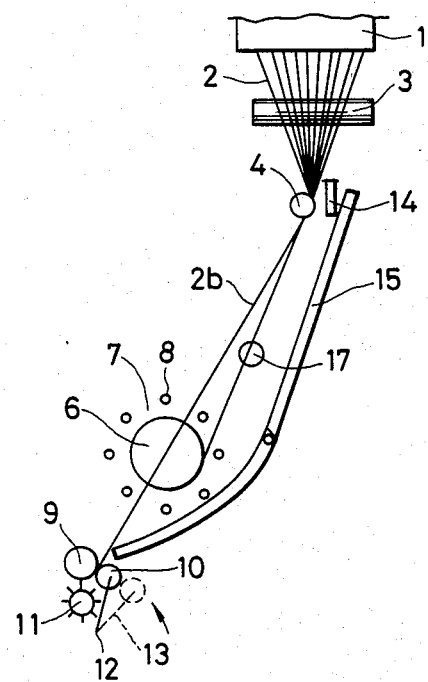
FIG. 1 is a side elevational view of a strand takeup machine having the primary and auxiliary winding means according to a first embodiment of the invention.
Figure 2:
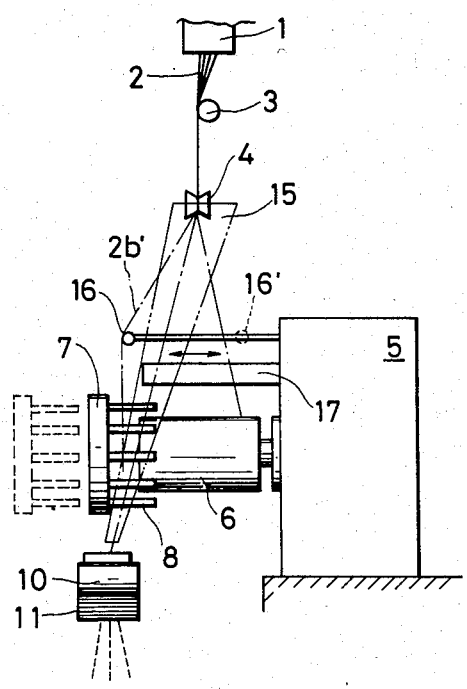
FIG. 2 is a front elevational view of the winding means shown in FIG. 1.
Figure 3:
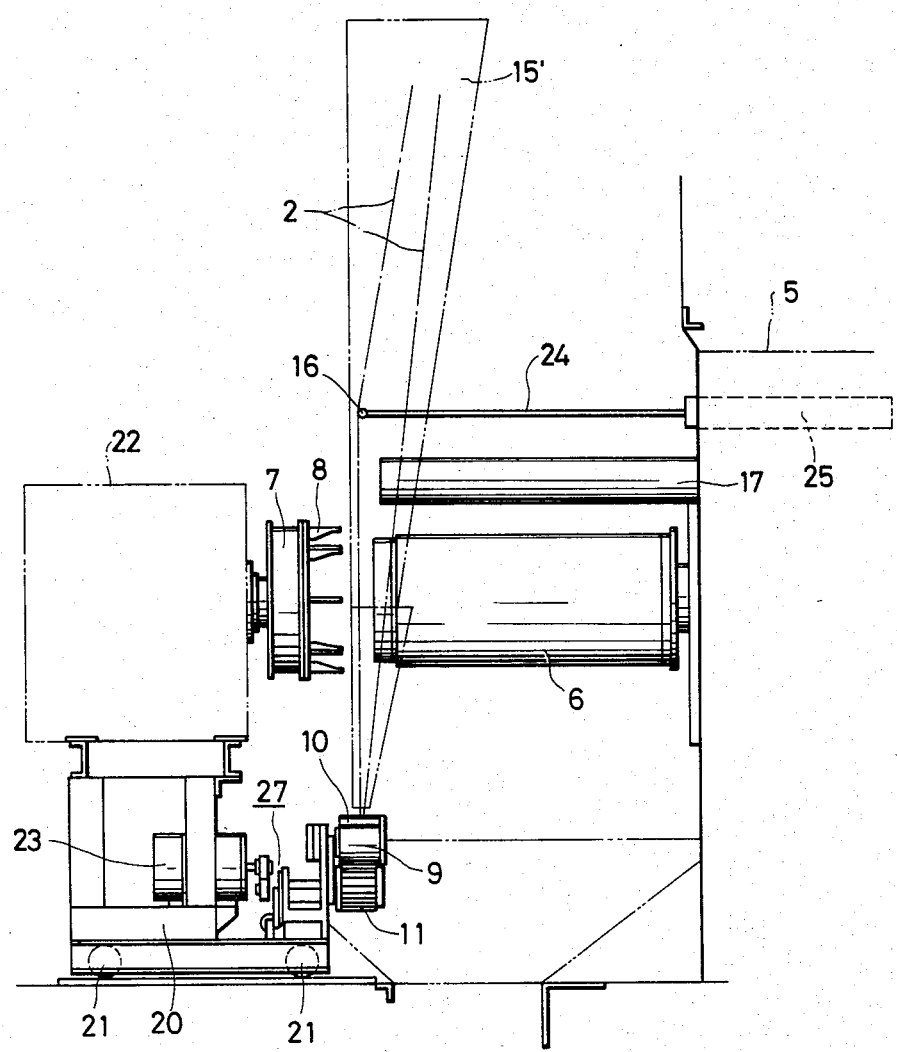
FIGS. 3 and 4 are detailed front and side elevational views of the first embodiment of the present invention.
Figure 4:
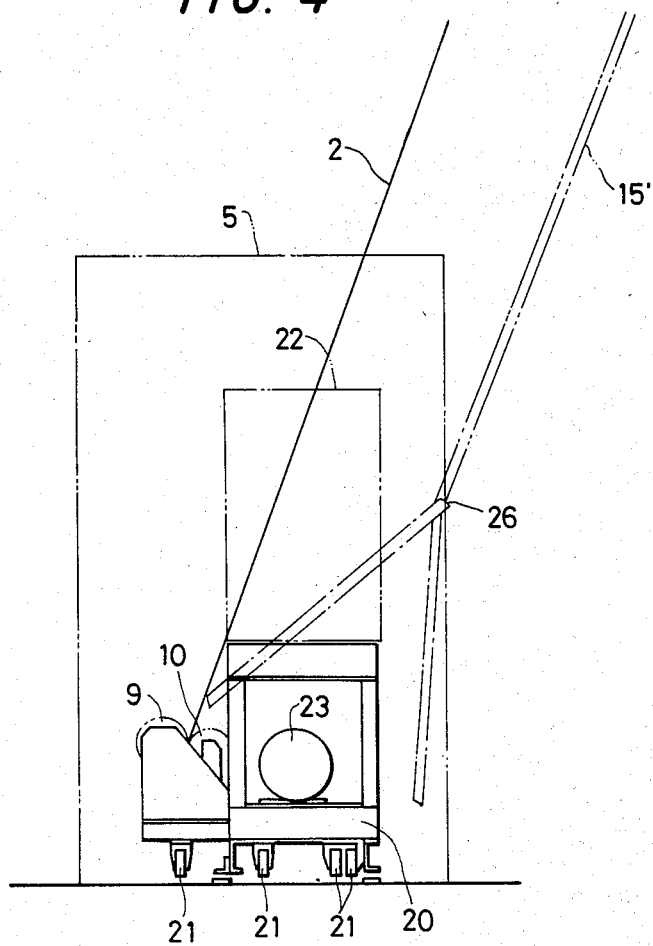
Figure 5A:
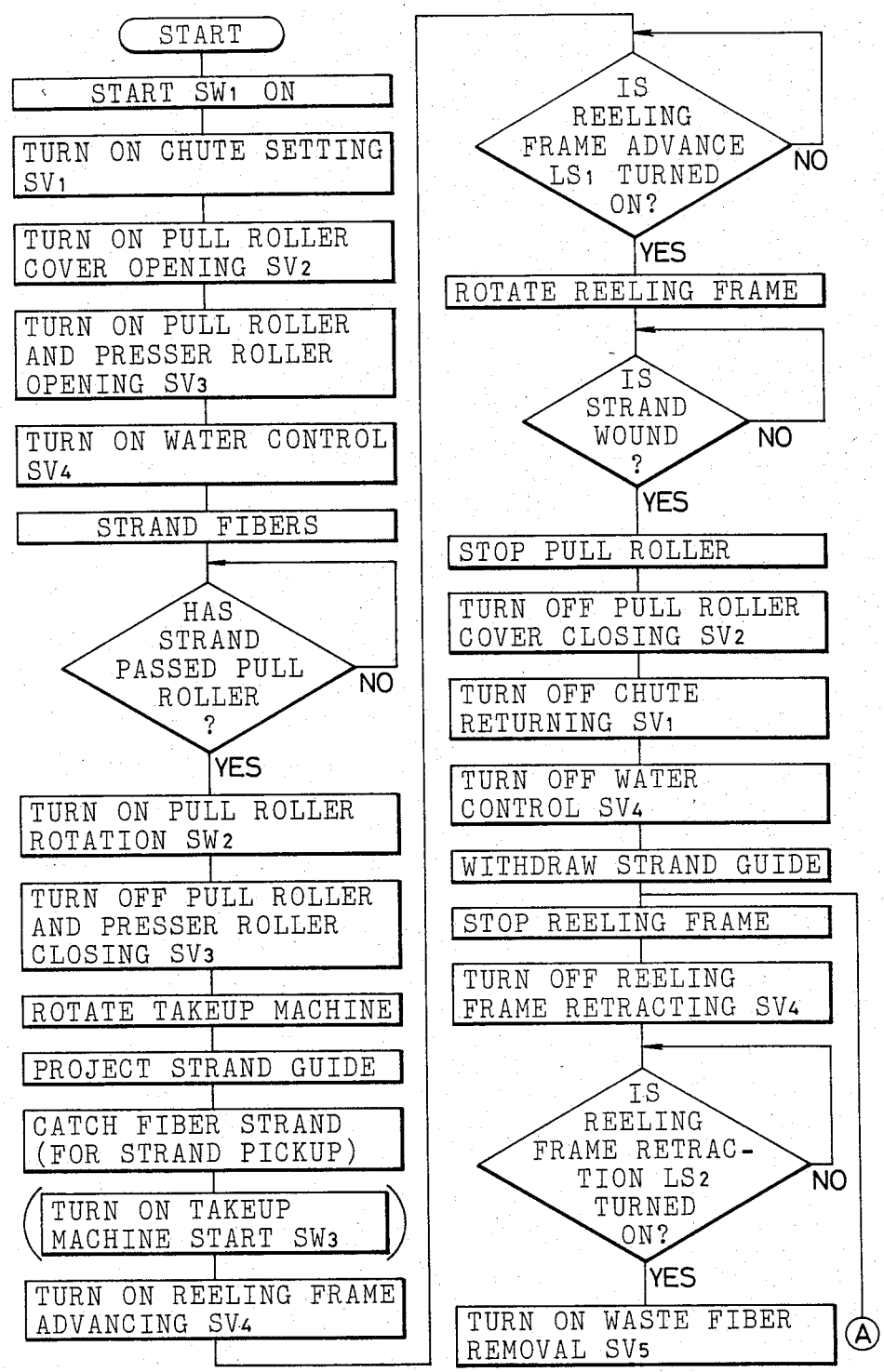
FIG. 5 is a flowchart showing a sequence of the steps for winding operation according to the invention.

FIGS. 1 and 2 schematically show a first embodiment of the present invention, and FIGS. 3 and 4 illustrate an apparatus according to the embodiment. FIG. 5 is a flowchart of steps of a winding method according to the present invention. As shown in FIG. 1, glass fiber filaments 2 are drawn off from a spinning bushing 1 having a number of nozzles, oiled by an application roller 3, collected by a collecting or gathering roller 4, and wound on primary winding means such as a collet or spindle 6 in a glass fiber takeup machine 5 disposed below. Fluid guiding means 15 such as a chute extends obliquely below the bushing 1 and has on an upper end a nozzle 14 for ejecting fluid such as water. The glass fiber filaments 2 which are drawn off from the bushing 1 go down with a stream of water flowing down the chute 15 and are guided to the collet 6 in the takeup machine 5. The stream of water serves to guide the glass fiber filaments properly without imposing a harmful effect on the glass fiber filaments. The inclined chute 15 is advantageous in that it prevents the water stream from splashing the takeup machine 5. However, the chute 15 may be disposed vertically. The chute 15 is tapered downwardly so that its transverse width is progressively reduced toward the takeup machine 5 positioned therebelow.

An auxiliary winder means according to the present invention comprises an auxiliary winding or takeup device such as a reeling frame disposed in coaxial relation to the collet 6 and movable back and forth between a dotted-line position and a solid-line position as shown in FIG. 2. The reeling frame 7 has pegs 8 having free ends projecting toward the collet 6 and hence is of a construction with an open side facing the collet 6. This construction allows a strand 2b of glass fibers to be temporarily caught by and wound on the reeling frame 7. The pegs 8 are arranged in a circle larger in diameter than the collet 6 and sized so that they surround the outer periphery of the collet 6 when the reeling frame 7 is located in the solid-line position. The reeling frame 7 can be rotated when necessary as described later on. To wind a strand of glass fibers tentatively on the reeling frame 7, it is preferably to employ a mechanism for gripping and pulling the end of the fiber strand and passing the latter in the vicinity of the collet to enable the reeling frame 7 to catch the fiber strand. Such a mechanism will be described hereinbelow.

The strand pulling mechanism is in the form of a pull roller assembly, for example, comprising a fixed roller 9 and a movalbe roller 10. For winding the strand, the strand that is drawn from the bushing 1 is first gripped between the rollers 9, 10. A cutter roller 11 serves to cut the strand as delivered by the pull roller assembly into chopped strands or short pieces for facilitating strand handling until the strand is transferred to the collet for normal winding. As shown in FIG. 1, the movable roller 10 is rotatably supported on a cradle 13 swingable about a shaft 12 and movable from the dotted-line position in the direction of the arrow into contact with the fixed roller 9 being rotated, whereupon the movable roller 10 is caused to rotate. The strand is then gripped and pulled by the rollers 9, 10, which are positioned at a lower end of the chute 15. A strand guide 16 is displaceable from a position in which the strand is normally wound on the collet to a position over the reeling frame 7 for temporarily winding the strand of glass fibers as pulled around the reeling frame 7. The strand guide 16 is actuatable by a cylinder and piston mechanism in the takeup machine 5 or other similar mechanisms. A preferable actuator for the strand guide will be described later.

With the apparatus of the foregoing basic construction, glass fiber strand after having been drawn off will be wound onto the primary winding means 6 such as a collet in a sequence of steps as shown in the flowchart of FIG. 5 as described below.

When the apparatus starts operating to draw glass fiber filaments apart from the bushing 1, the pull roller assembly begins to operate and the water eject nozzle 14 ejects water. The ends of the glass fiber filaments as discharged from the bushing 1 are manually grasped and guided through the application roller 3 and the gathering roller 4 to an upper inlet of the chute 15. The strand of glass fibers that is guided onto the chute 15 flows down the chute 15 with an ejected stream of water until it reaches the fixed roller 9 of the pull roller assembly. At this time, the movable roller 10 is shifted from the dotted-line standby position to the solid-line clamping position to cooperate with the fixed roller 9 in gripping the glass fiber strand. Since the fixed roller 9 is rotated, the gripped glass fiber strand is caused by the rollers 9 and 10 to be fed downwardly along and then chopped by the cutter roller 11 below into short lengths which are treated as waste strands. The glass fiber strand which is gripped by the rollers 9 and 10 is tensioned so that it is kept taut as shown at 2b in FIG. 1 between the collection roller 4 and the rollers 9, 10. The glass fiber strand is discharged for a while in this position. The strand guide 16 is then moved from the dotted-line position 16' to the left to displace the strand toward a position 2b' in which the strand is displaced off the collet 6. The movement of the strand is effected via a connecting rod 24 by a cylinder 25 incorporated in the takeup machine 5 (FIG. 3).

Then, the reeling frame 7 is moved from the dotted-line standby position to the solid-line position and simultaneously starts rotating. As the glass fiber strand are travelling along the path 2b', they are caught by the pegs 8 of the reeling frame 7 and then wound around the reeling frame 7. During this time, the collet 6 and a strand traversing mechanism 17 in the takeup machine 5 begins operating, with the collet 6 rotating at a winding speed. When the glass fiber strand as it is wound on the reeling frame 7 is fed along at a speed equal to the peripheral speed of rotation of the collet 6, under a condition which allows the strand to be wound onto the collet 6, the strand guide returns from the lefthand solid-line position 16 to the righthand dotted-line position 16' in FIG. 2. The glass fiber strand 2 is displaced under their own tension toward the collet 6. Thereafter, the glass fiber strand is automatically caught by the traversing strand guide 17 which is reciprocably traversing along the collet 6 and is brought into contact with the periphery of the collet 6 being rotated at a high speed, whereupon the fiber strand is easily wound onto the collet 6. The fiber strand is now caused to traverse and begins to be wound normally around the collet 6. The reeling frame 7 is moved back to the dotted-line position of FIG. 2, and a glass fiber strand remaining on the reeling frame 7 is removed manually or by another separate mechanism.

During the foregoing process, a series of operations such as water ejection from the eject nozzle 14, following actuation of the movable roller 10 and rotation of the roller 9 and the cutter roller 11 in timed relation to the water ejection, movement of the reeling frame 7 to its operating position and rotation thereof, reciprocable movement of the strand guide 16, and subsequent retraction of the reeling frame 7 to the standby position, are carried out by a cylinder and piston mechanism, a fluid supply circuit coupled therewith, solenoid-operated valves disposed in the fluid supply circuit, and other components under the control of a sequence circuit, which comprises a known programmed control mechanism that is used to control conventional automatic winders for their operations. Such a control mechanism will not be described in detail. According to this programmed control, a fiber strand end can be wound onto the collet 6 automatically without any manual work. Therefore, the object of the present invention to save manual operation can be achieved.

FIGS. 3 and 4 show a detailed construction according to the first embodiment of the invention. Corresponding parts in FIGS. 3 and 4 are denoted corresponding reference numerals in FIGS. 1 and 2, and will not be described to avoid a repeated description.

Designated in FIGS. 3 and 4 at 20 is a base, 21 rollers supporting the base 20, 22 an upper cover which houses therein a mechanism for drivingly rotating the reeling frame 7, 23 a motor for driving the fixed roller 9 of the pull roller assembly, and 27 a belt transmission mechanism for the motor. As illustrated in FIG. 4, a chute 15' is bendable by a joint 26 such that a portion of the chute 15' extending between the joint 26 and a distal end of the chute 15' will be pivotably moved to bring the distal end of the chute toward the rollers 9 and 10 of the pull roller assembly for guiding a strand of glass fibers to the rollers. The reeling frame 7, the rollers 9 and 10 of the pull roller assembly, and the cutter roller 11 are all mounted on the base 20 as a unit. The reeling frame 7 is slidably movable with cover 22 toward and away from the collet 6 for its operation described with reference to FIGS. 1 and 2. Upon malfunction of the apparatus or for maintenance of the apparatus, the rollers 21 supporting the base 20 are rollingly moved to displace the auxiliary winding means and the associated means from the primary winding means to the left in FIG. 3 for the ease of repair of servicing. The arrangement of FIGS. 3 and 4 is also applicable to switchable type winding on a takeup machine having two collets 6 mounted in juxtaposed relation on a turret, as later described. In such an application, the base 20 is fixed in position.

In the above described embodiment, the chute 15 may be formed in a cylinder with a longitudinal slot defined therein. The fluid for guiding the fiber strand may not be water but a gas such as air.

With the arrangement of the invention as described above, glass fiber filaments as they have been drawn off from discharge nozzles can be wound onto the collet in the takeup machine in a fully automatic operation, so that the glass fiber filaments can be wound easily with less labor.

Figure 6:
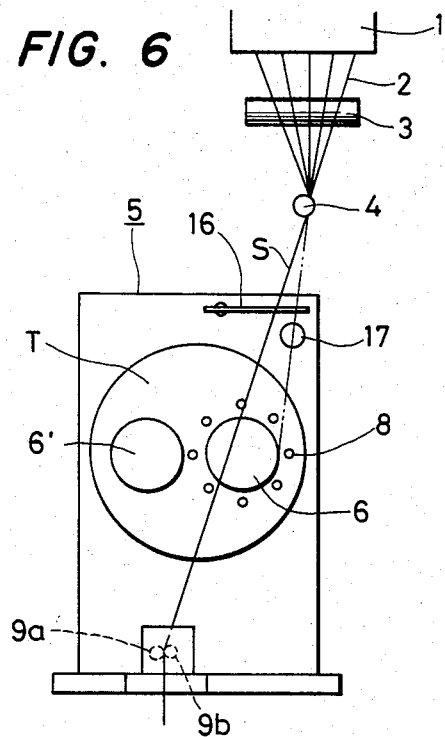
FIG. 6 is a side elevational view of a strand takeup machine having a winder according to a second embodiment of the invention.
Figure 7:
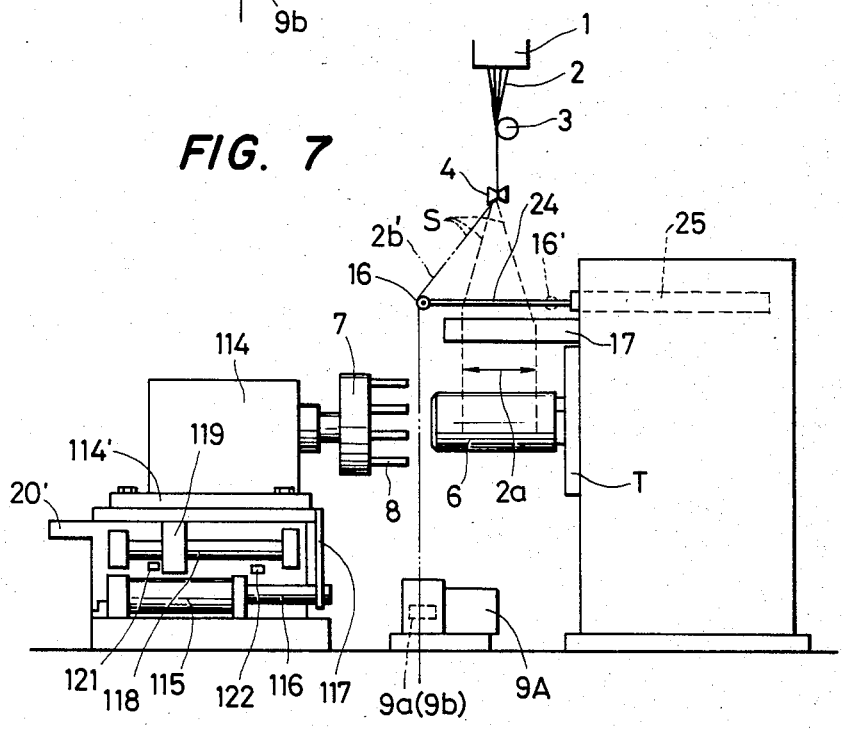
FIG. 7 is a front elevational view of the strand takeup machine shown in FIG. 6.
Figure 8:
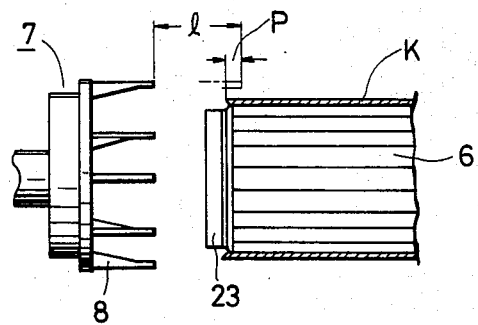
FIG. 8 is a fragmentary vertical cross-sectional view of the strand takeup machine shown in FIG. 6.

A second embodiment of the invention will now be described with reference to FIGS. 6 to 8. A system according to the second embodiment in which the same reference numerals denotes the like components is suitable for winding the ends of fiber filaments 2 as they start being drawn off onto collets while the filaments are being pulled by the similar pulling mechanism disposed below. This system includes a pluality of collets, such as a first collet 6 and a second collet 6' rotatably mounted on a rotary turret T. As shown in FIG. 7, the strand S of glass fiber filaments 2 while being normally wound onto the collet 6 traverses an interval 2a. The strand S of glass fiber filaments 2 before it is wound on the collet 6 is displaced by a strand guide 16 to a position 2b'. The second embodiment does not include the fluid guide means 15.

An auxiliary winder according to the present invention comprises a reeling frame 7 rotatable by a motor 114. The reeling frame 7 is disposed in coaxial relation to the collet 6 and is movable back and forth a distance l as illustrated in FIG. 8, wherein 23 denotes a front cover, i.e. a front cap, for the collet 6. The back-and-forth movement of the reeling frame 7 is effected by a reciprocating mechanism composed primarily of a cylinder 115 and its output rod 116. The motor 114 is supported on a movable bed 114' which is mounted on a fixed bed 20' which is stationarily provided on the floor, the movable bed 114' having a righthand end connected by a connecting frame 117 to the end of the output rod 116. The movable bed 114' has a frame body 119 slidable on and along a guide rod 118 secured to the fixed bed 20'. The distance l (FIG. 8) that the reeling frame 7 is reciprocably movable is determined by limit switches 121 and 122 positioned at the ends of the guide rod 118. The reeling frame 7 supports a plurality of pegs 8 for winding the fiber strand therearound, the pegs 8 having distal ends projecting toward the collet 6. As illustrated in FIG. 8, the pegs 8 are arranged in a circle larger in diameter than and concentric with the collet 6. When the pegs 8 are advanced to the dotted-line position, the circularly arranged pegs 8 surround an outer periphery of a sleeve K of the collet 6 and overlap the sleeve K for the length indicated by a portion P of the distance l that the reeling frame 7 is reciprocable.

For winding glass fiber strands S as they start being drawn off, the leading ends of the glass fiber filaments 2 drawn from the bushing 1 are manually led through the application roller 3 and the gathering roller 4 downwardly to the pulling mechanism. The pulling mechanism has a pair of known nip rollers 9a and 9b for gripping and pulling the glass fiber strand S.

At this time, the strand guide has been advanced to the left as shown in FIG. 7 to hold the strand S of glass fiber filaments 2 temporarily in the position 2b'. Immediately thereafter, the reeling frame 7 which has been in the lefthand standby position is moved the distance l as shown in FIG. 8, whereupon the free ends of the pegs 8 overlap the sleeve K or flange of the collet 6 by the distance P outside of the interval of traversing movement of the fiber strand. The reeling frame 7 is simultaneously rotated by the motor 114. As a result, the strand of glass fiber filaments is trapped between the pegs 8 on the reeling frame 7 and wound around the pegs 8, during which time the collet 6 starts to be actuated. When the reeling frame 7 then starts to wind the fiber strand at a speed which is the same as the peripheral speed of rotation of the collet 6, the strand guide 16 is retracted from the lefthand position of FIG. 7 to a righthand position 16'. The glass fiber strand are then caused to move under their own tension onto the collet 6 toward the center of the interval 2a of traversing movement which is shown by the dotted lines in FIG. 7. By this time, the takeup machine 5 has already been in operation, and the strand of glass fiber filaments 2 is brought of its own accord into engagement with a strand traversing guide or hook (not shown) of the traversing mechanism 17. The fiber strand then begins to traverse, contacts the periphery of the collet 6 being rotated, and is wound therearound. The fiber strand is subsequently wound around the collet 6 while the strand is being moved laterally back and forth. The reeling frame 7 returns to the standby position, and the fiber strands remaining on the reeling frame 7 are removed manually or by another mechanical means.

The series of movements of the reeling frame 7 such as advance to and withdrawal from the operating position, and rotation, can be carried out by a known programmed control mechanism available for controlling conventional automatic winders. According to this programmed control, the end of a fiber strand can automatically, but not manually as is conventional, be wound onto the collet 6. The object of this embodiment to save manual operation can thus be achieved.

The winder of this embodiment can be for continuously switchable type strand winding. More specifically, two collet 6 and 6' are journalled on the turret T, which is rotatable 180° at a time for moving the collets alternately from a standby position to an operating position to perform continuous strand winding. When the collets are switched around, the glass fiber strand is temporarily taken up by the reeling frame 7, and after the full collet 6 has been replaced with the empty collet 6', the glass fiber strand is transferred from the reeling frame 7 over to the new collet 6'. Therefore, the present invention can be incorporated in such a glass fiber takeup machine for efficient continuous strand winding operation.

A third embodiment of the present invention will be described hereinbelow with reference to FIG. 9.

Figure 9:
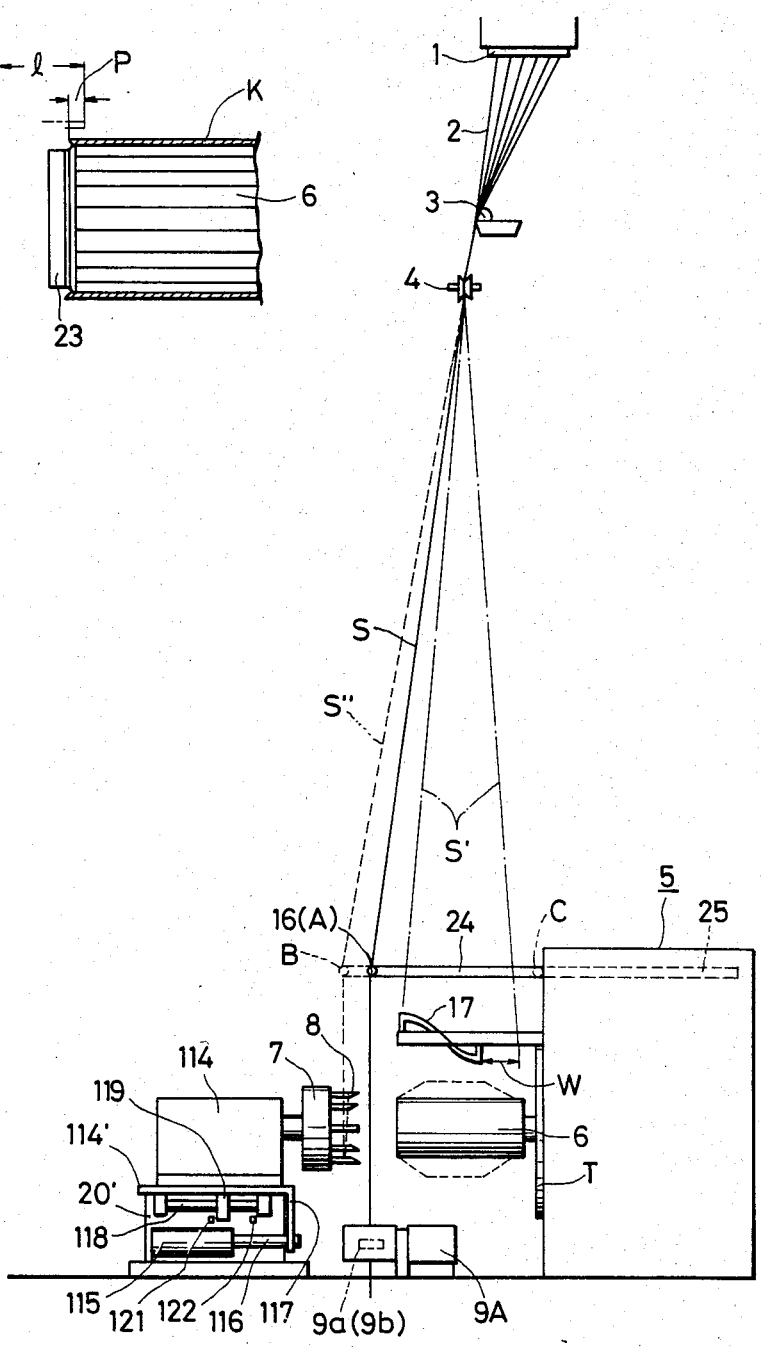
FIG. 9 is a schematic side elevational view of a third embodiment of the invention.

FIG. 9 is a schematic side elevational view of an apparatus which similar to the second embodiment and in which a strand of collected glass fiber filaments is caused by lower pull rollers to pass through a strand guide 16 projecting in a given position A and in front of the front face of a distal end of a takeup collet 6, and then is wound around the takeup collet 6. A multiplicity of glass fiber filaments 2 which have been drawn off from an upper spinning bushing 1 is held against a sizing agent application roller 3 by which sizing agents are applied to the glass fiber filaments 2, which are then collected by a collection roller 4 into a single strand S. The strand S is then held against a projecting strand guide 16 secured to a distal end of a support rod 24 actuatable by a pressure cylinder 25 mounted in an upper portion of a takeup machine 5 positioned below. The strand s is sandwiched between a pair of pull rollers 9a, 9b driven by a motor 9A disposed below and travels along a path in front of the front face of a distal end of the takeup collet 6 in the takeup machine 5 in preparation for being wound on the takeup collet.

An auxiliary winder reeling frame 7 has a plurality of pegs 8 projecting from an end thereof and is rotated by a motor 114 in coaxial relation to the takeup collet 6.

The motor 114 is fixedly mounted on a movable base 114' which is movable toward and away from the take up collet 6. A connecting rod 117 dependent from a terminal edge of the movable base 114' is connected to an end of an output shaft 116 of a pressure cylinder 115 secured to a fixed bed 20'. A guide frame 119 projects downwardly from the movable base 114' and is fitted over and guided by a guide rod 118 mounted on the fixed bed 20'.

A pair of limit switches 121 and 122 are actuatable by contact with the guide frame 119 for detecting the ends of an interval of reciprocable movement of the auxiliary winder reeling frame 7.

A rotatable collet supporting table T supports two collets 6 and 6' and is angularly movable through 180° to transfer each collet to a winding position, a full bobbin unloading position, and an empty bobbin loading position. A wire traversing device 17 is positioned obliquely upwardly of the takeup collet 6 and has a shaft rotatable with the takeup collet 6 while moving reciprocably in an interval w.

When the strand is ready for winding operation as described above, the pressure cylinder 115 is operated to displace the reeling frame 7 into the path of movement of the strand S. After the limit switch 122 has been activated to confirm that the distal ends of the pegs 8 project around the outer periphery of the distal end of the takeup collet 6, the motor 114 is energized to rotate the reeling frame 7, whereupon the strand S starts to be wound thereon by being first engaged by and between two pegs 8, and the takeup collet 6 is simultaneously driven to rotate about its own axis. When the reeling frame 7 and the takeup collet 6 rotate at a predetermined speed, the pressure cylinder 25 is actuated to withdraw the strand guide 16 quickly to an inoperative position C. The strand S is now caused to be brought into contact with the wire traversing device 17 and is wound onto the collet 6 while traversing the latter. The reciprocable movement of the wire traversing device 17 in the axial interval w enables the strand to be wound in layer as shown by the dotted lines in FIG. 9.

The reeling frame 7 is stopped in the meantime to pull a strand S' until severed between the reeling frame 7 and the takeup collet 6. The pressure cylinder 115 is actuated in an opposite direction to retract the reeling frame 7 until it abuts against the limit switch 121, and simultaneously a waste strand wound on the reeling frame 7 is automatically removed therefrom. When the strand S' is fully wound on the takeup collet 6, the reeling frame 7 is advanced while starting to rotate, and the strand guide 16 is rapidly moved from the inoperative position C to the position A for auxiliary winding. The takeup collet 6 is brought to a stop to cut off the strand under tension between the reeling frame 7 and the takeup collet 6. The reeling frame 7 as it rotates is retracted to the standby position, and in response to this movement, the strand guide 16 moves to the position B. Then, the rotatable collet supporting table T is quickly turned through 180° to bring the full bobbin to the bobbin unloading position and the takeup collet 6' with an empty bobbin thereon to the winding position. At this time, the reeling frame 7 and the takeup collet 6' are driven by the motor drive to rotate at the preset speed for winding a strand S" shown in the dotted line around the reeling frame 7. The reeling frame 7 is moved forward from the standby position while rotating about its own axis, and in response thereto the strand guide 16 is retracted from the position B to the position A. The strand S' is thereafter is wound on the takeup collet 6' properly by withdrawing the strand guide 16 quickly to the inoperative position C.

The fully wound bobbin is manually taken from the takeup collet 6 which has been in the full bobbin unloading position, and an empty bobbin is fitted onto the takeup collet 6.

The foregoing steps of operation of the apparatus shown in FIG. 9 are similarly performed by a programmed control mechanism at predetermined timing under the control of an ordinary sequence control circuit. The above cycle is repeated to effect continuous winding of the strand S' unless the strand S' is accidentally cut off.

When the strand S' is cut off, the apparatus is brought back to the condition of FIG. 9. Multiple glass fiber filaments 2 which are drawn off from the spinning bushing 1 are manually gathered, and held against the sizing agents application roller 3 and the collection roller 4 and are pulled downwardly as a strand S, which is fed via the strand guide 16 and sandwiched between the lower pull rollers 9a and 9b. The strand S now travels along the path as described above in preparation for winding operation.

As described above, the apparatus of this embodiment feeds the strand just prior to being wound under constant tension between the spaced but confronting faces of the takeup collet and the auxiliary winder feeling frame for mechanically catching the strand reliably on the auxiliary winder reeling frame. This can therefore contribute to the safety of automated operation of glass fiber spinning and winding apparatus.

A fourth embodiment of the invention will now be described with reference to the drawings.

Figure 10:
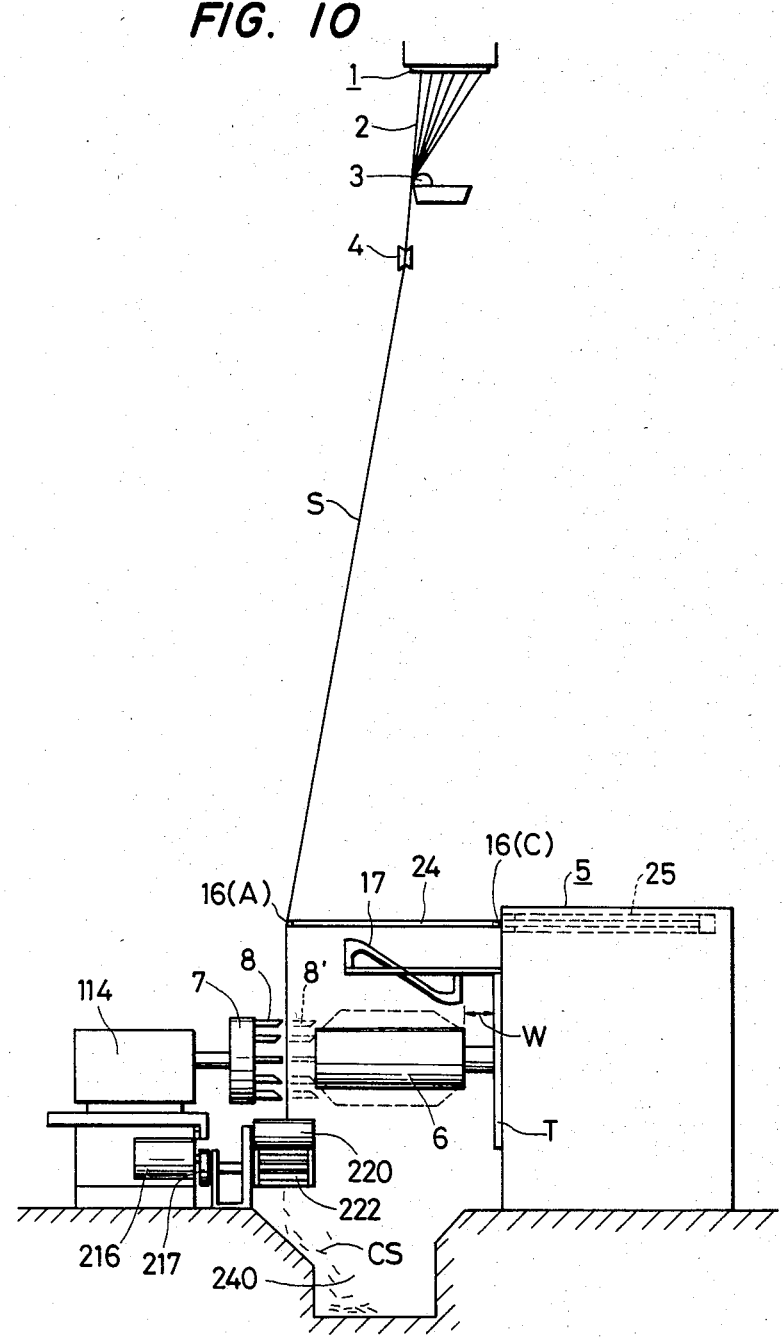
FIG. 10 is a schematic side elevational view of a fourth embodiment of the invention.
Figure 11:
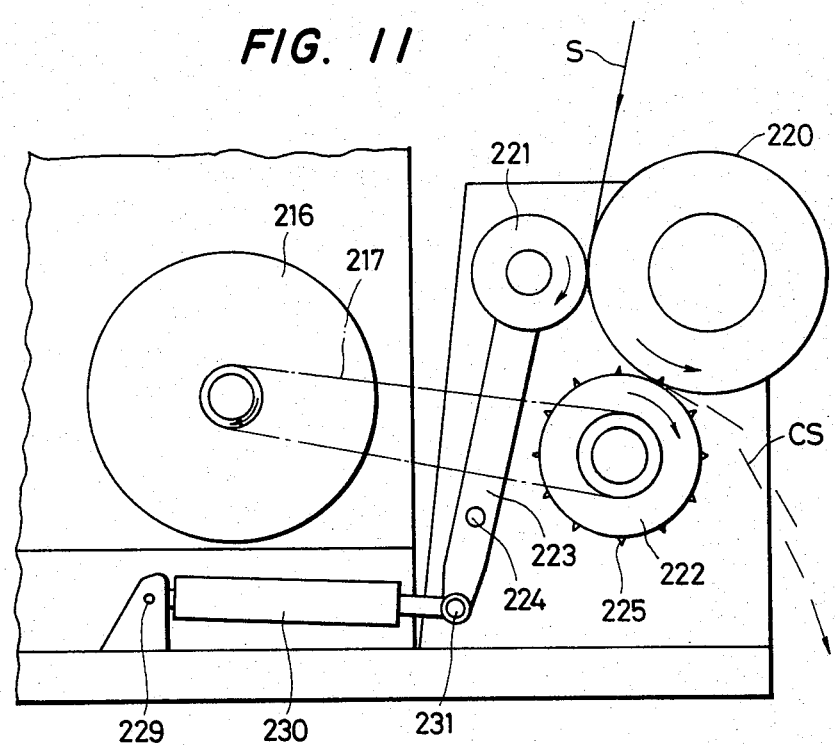
FIG. 11 is a enlarged fragmentary front elevational view of the fourth embodiment.

FIGS. 10 and 11 are side elevational and enlarged views, respectively, of a glass fiber spinning and winding apparatus having a device for pulling and cutting a strand of glass fiber filaments and means for cutting the waste strand CS. In FIG. 10, the strand S of glass fiber filaments collected when spinning is started is transferred through a projecting strand guide 16 and in front of a distal end of a collet 6 to a pulling and cutting device disposed downwardly. As shown in FIG. 11, the strand S is sandwiched between a guide roller 220 and a press roller 221 in the pulling and cutting device and then cut off by cutter blades 225 on a roller 222 held against a lower peripheral surface of the guide roller 220, into chopped strands CS which fall into a discharge channel 240. Also, in the fourth embodiment, the like components are indicated by the same reference numerals used in the preceding embodiments.

FIG. 11 is side elevational view of a central part of the strand pulling and cutting device of the fourth embodiment, the view showing the strand S being pulled and severed. The guide roller 220 is of a larger diameter and has a resilient surface layer. The press roller 221 is rotatably mounted on a distal end of a swingable bar 223 pivotably supported on a pivot shaft 224. When the press roller 221 is pressed against the guide roller 220, the strand S is gripped at a nipping point between the rollers 220 and 221 under a pressure controlled by a pressure cylinder 230 having one end supported on a fixed shaft 229 and an output shaft end 231 coupled to a lower end of the swingable bar 223.

The cutter blades 225 mounted on the cutter roller 222 extend axially on its periphery and are secured at equal peripheral intervals. The cutter roller 222 is pressed against the guide roller 220 so that the distal edges of the cutter blades 225 will bite into the peripheral surface of the guide roller 220. The cutter roller 222 is positively driven to rotate by a motor 216 through a transmission belt 217. The cutter roller 222 has an upper peripheral surface located below the nipping point between the guide roller 220 and the press roller 221.

When the strand S is broken off, the output shaft of the pressure cylinder 230 is caused to project slightly to separate the press roller 221 from the surface of the guide roller 220, and a cut strand end is inserted into a gap between the rollers 220 and 221, and then the pressure cylinder 230 is actuated to pull in its output shaft for thereby gripping the strand.

When the motor 216 is energized, the cutter roller 222 is rotated in the direction of the arrow to rotate the guide roller 220 and the press roller 221 in the directions of the arrows for thereby pulling the strand S downwardly, which are cut off into chopped strands CS at a position in which the cutter blades 225 are pressed into the peripheral surface of the guide roller 220, the chopped strands CS being discharged downwardly. The downward pull on the strand S is continued until the reeling frame 7 is advanced toward the collet 6 to begin auxiliary winding of the strand S. When it is confirmed that the reeling frame 7 starts winding the strand, the motor 216 is de-energized, and an uncut waste portion in the pulling and cutting device is rewound stably onto the reeling frame 7 under tension. The pulling and cutting device remains inactivated until the strand being drawn off suffers a next breakage.

While in the fourth preferred embodiment the rotatable pulling mechanism comprises the guide roller 220 and the press roller 221 and the cutting mechanism comprises a cutter roller 222 held against the guide roller 220, the rotatable pulling mechanism may be replaced with a meshing gear mechanism for pulling and cutting a strand simultaneously, or a combination of pin rollers may be employed for pulling the strand with a cutting device provided separately.

In the illustrated embodiment, the rollers are relatively positioned such that the cutter roller 222 pressed against the guide roller 220 has its upper surface facing and positioned vertically downwardly of the nipping point between the guide roller 220 and the press roller 221. This arrangement ensures that the waste strand which is pulled off the surface of the guide onto the guide roller 220 for pulling and cutting off the strand effectively.

As described above, the waste strand of glass fiber filaments which is drawn off at an initial spinning stage is pulled downwardly in front of the free end of the collet and then cut off. While the auxiliary winder reeling frame is being rotated to wind the fiber strand, the strand can be tensioned by a force necessary for stable winding, and the leading waste strand is such that it will be wound back in a minimum length, thereby reducing a power needed for operating the device. The condition in which the strand is wound on the reeling frame is maintained well, and hence the strand can smoothly be wound onto the collet.

A fifth embodiment of the invention will now be described with reference to FIG. 12 to 14 in which the same reference numerals and characters are used to indicate the like components as in the preceding embodiments.

Figure 12:
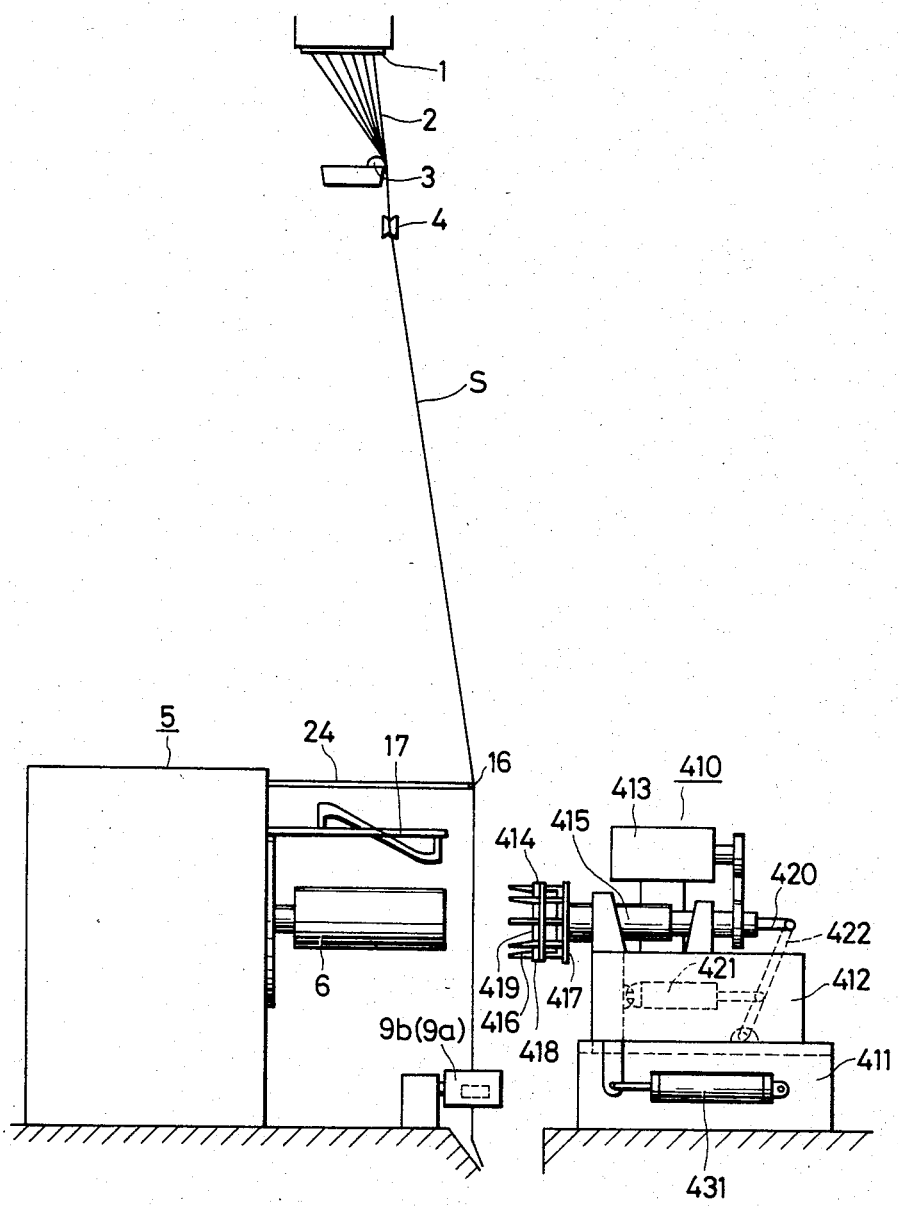
FIG. 12 is a side elevational view of a glass fiber spinning and winding apparatus and an auxiliary winder of a fifth embodiment of the invention.

FIG. 12 is a side elevational view of a glass spinning and winding apparatus having an auxiliary winder according to the present invention. The parts of the apparatus are shown as being positioned in preparation for winding glass fiber strand when spinning is started, with a strand of glass fiber filaments drawn off being transported by a lower pulling device through a space between a takeup collet and an auxiliary winding frame which confront each other without being wound on the collet or the auxiliary winding frame.

Figure 13:
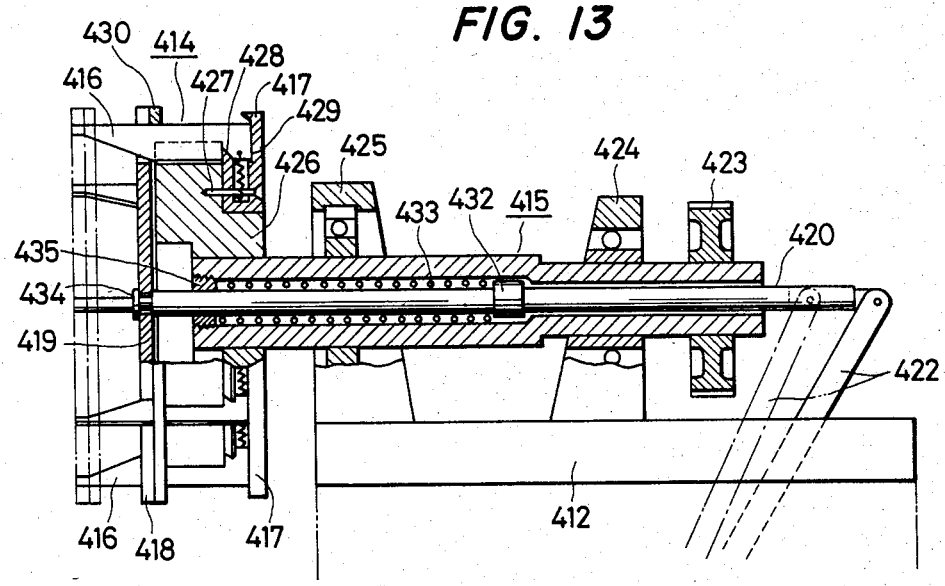
FIG. 13 is a side elevational view, partly in cross section, of the auxiliary winder.

In FIGS. 12 to 14, an auxiliary winder 410 according to the invention comprises a support bed 411 mounted on the floor, a mount base 412 placed slidably on the support bed 411, a motor 413 mounted on the mount base 412, and a hollow rotatable shaft 415 supported by bearings on the mount base 412 and having a winding frame 414 on its distal end. The hollow rotatable shaft 415 is drivable for rotation by a suitable transmission mechanism by which the shaft 415 and the motor 413 are operatively coupled.

A pressure cylinder 431 is secured to the support bed 411 and has an output shaft connected to a fixed leg of the mount base 412. Actuation of the pressure cylinder 431 thus causes the mount base 412 to slid on the support bed 411 toward and away from the collet 6.

The apparatus is shown in FIG. 12 as being in a condition such that the mount base 412 is most remotely from the collect 6.

The winding frame 414 is composed of a plurality of members, bar-shaped pegs 416 of a rectangular cross section in the fifth embodiment, defining a peripheral surface for winding the strand thereon, and a rotatable base 417 supporting the proximal ends of the pegs and fixed to an end of the hollow rotatable shaft 415. A pusher plate 419 has on its peripheral edge a plurality of strand catchers 418 projecting radially outwardly in respective spaces between adjacent ones of the pegs 416, the pusher plate 419 being rotatably supported on a front end of a pusher rod 420 inserted through the hollow rotatable shaft 415. The rear end of the pusher rod 420 is coupled to an upper end of a lever 422 which is swingably movable by a pressure cylinder 421 mounted on the mount base 412. Thus, the pusher rod 420, the lever 422, and the pressure cylinder 421 jointly constitute a mechanism for displacing the pusher plate 419 with the strand catchers 418 thereon. The winding frame 414 according to the present invention is not limited to the foregoing construction, but may be a cylindrical body having a multiplicity of slits.

FIG. 13 is an enlarged side elevational view, with parts in cross section, of the winding frame 414, a mechanism for rotating and supporting the same, and the mechanism for displacing the strand catchers 418, and FIG. 14 is a front elevational view of the winding frame, as seen from the left of FIG. 13.

The rotatable base 417 of the winding frame 414 is fastened by screws 427 to one side of a holder 426 affixed to the front end of the hollow rotatable shaft 415. The rotatable base 417 has an annular groove in which the rear ends of the pegs 416 are fitted and includes a deep recess in which the shanks of the screws 427 are exposed. The rotatable base 417 also has a projecting edge 428 fitted in slots defined in lower edges of the pegs 416. The holder 426 has on its outer periphery recesses in which the pegs 416 are fitted. Tension springs 429 are disposed in the recess in the rotatable base 417 and extend between the rear ends of the pegs 416 inserted in position with the slots fitted over the projecting edge 428 and the screws 427 for thereby holding the rear ends of the pegs 416 stably in the annular groove in the rotatable base 417.

As shown in FIG. 14, the pusher plate 419 has a plurality of rectangular slots defined in its pripheral edge and receiving therein the pegs 416 with the strand cathers 418 extending between the adjacent rectangular slots. A holder ring 430 is secured to one side of the peripheral edge of the pusher plate 419 for holding the pegs 416 against radially outward displacement thereof. The pusher plate 419 is supported by a screw 434 on the distal end of the pusher rod 420 against axial disengagement therefrom and for free rotation thereon. The two-dot-and dash lines in FIG. 14 are indicative of a position in which a waste strand layer WS is wound on the pegs.

The hollow rotatable shaft 415 through which the pusher rod 420 extends includes a smaller-diameter bore positioned rightward of a central larger-diameter portion 432 of the pusher rod 420 and a larger-diameter bore in which the larger-diameter portion 432 is movable. A plug 435 having a small-diameter hole is threaded in an end of the larger-diameter bore remotely from the smaller-diameter bore, there being a coil spring 433 disposed in the larger-diameter bore between the larger-diameter portion 432 and the plug 435. The hollow rotatable shaft 415 is supported on the mount base 412 by a pair of bearings 424 and 425 and has a timing pulley 423 secured thereto and drivable for rotation by a timing belt driven by the motor.

Operation of the apparatus of the fifth embodiment is as follows: When the apparatus is in the position of FIG. 12 in preparation for winding the strand, the pressure cylinder 431 of the auxiliary winder 410 is actuated to push the mount base 412 to the left. As soon as the distal ends of the pegs 416 of the winding frame 414 go beyond the strand S as extending between the strand guide 16 and the rotatable pulling device 9a, 9b, the pressure cylinder 431 serves to stop its extension to hold the strand by the winding frame 414 and the motor 413 is energized to start winding the strand S in a mode of auxiliary winding. When the speed of winding the strand S on the auxiliary winder becomes substantially equal to the predetermined speed of rotation of the collet 6 which has started rotating, the pressure cylinder 431 is actuated again to bring the distal ends of the pegs 416 slightly into overlapping relation to the end of the collet 6, and simultaneously the strand guide 16 is retracted rapidly toward the winding apparatus 5. The strand S is now caused to move smoothly onto the collet 6 and is engaged by the wire traversing device 17 whereby the strand S is caused to traverse the collet 6 and wound thereby. At the time of completion of the movement of the strand S toward the collet 6, the motor 413 is quickly de-energized to sever the strand wound on the auxiliary winder from the strand wound on the collet 6 under tension, with waste strand layers left on winding frame 414.

At this time, the pressure cylinder 431 is actuated in the opposite direction back toward the position of FIG. 12, and the pressure cylinder 421 is actuated to push the pusher rod 420 leftward to the dot-and-dash lines shown in FIG. 13 while compressing the coil spring 433, whereupon the pusher plate 419 supported on the distal end of the pusher rod 420 is advanced to the distal ends of the pegs 416 as illustrated by the dot-and-dash lines in FIG. 13.

The advancing movement of the pusher plate 419 causes the waste strand layer WS wound as shown by the two-dot-and-dash lines in FIG. 14 to be slid by the strand catchers 418 along the outer edges of the pegs 416 until the strand layers WS and pushed off the distal ends of the pegs 416 and fall down. After the strand layers WS have been removed, the pressure cylinder 421 is inactivated to allow the pusher rod 420 and the pusher plate 419 to return to their original position under the force of the spring 433.

As the strand S approaches the condition of being substantially fully wound on the collet 6, the auxiliary winder 410 is advanced by the pressure cylinder 431 to move the distal ends of the pegs 416 into the position in which they overlap the end of the collet 6, at which time the motor 410 starts rotating. When the strand S is fully wound on the collet 6, the strand guide 16 quickly moves forward to cause the strand S to be wound temporarily on the auxiliary winder as the winding frame 414 is withdrawn slightly in the opposite direction by the pressure cylinder 431. Then, the fully wound collet 6 is moved to the bobbin unloading position, and another collet with an empty bobbin carried thereon is moved to the winding position, in which the collet is rotated. When the collet is rotated at the predetermined speed, the strand is displaced and wound on the collet. Thereafter, the winding frame 414 is retracted and stropped, and the waste strand is removed from the winding frame 414.

Where waste strand layers WS as wound on the winding frame 414 are in a large quantity, that is, a thick strand, for instance, is wound on the auxiliary winder, there would be instances wherein the waste strand layers WS could not easily be slid off simply by pushing the strand catchers 418 of the pusher plate 419. With the foregoing embodiment, however, the waste strand layers WS are kept taut by the strand catchers 418 due to the resilient tensioning of the rear ends of the pegs 416 as the pusher plate 419 is pushed forward, and the distal end of each peg 416 is caused to be tilted about the projecting edge 428 radially inwardly toward the axis of rotation of the pusher plate 419 as the latter is advanced. This allows the waste strand layer WS to be moved easily toward the distal ends of the pegs 416 for easy removal.

The auxiliary winder in glass fiber spinning and winding apparatus according to the present invention can wind a waste strand stably and reliably thereon on a tentative basis when collets are to be changed at an initial stage or intermediate stages of the spinning and winding process, and also can remove wound strand layers properly at appropriate time. Since the auxiliary winder requires no manual operation and can be automatized easily, it can contribute greatly to a higher efficiency of the process of manufacturing glass fibers.

A sixth embodiment of the invention in which water is used as the flowing fluid guide described with reference to the first embodiment will be described with reference to FIGS. 15 and 16. Also in this embodiment, the like components are designated by the same reference numerals used in the preceding embodiments.

Figure 16:
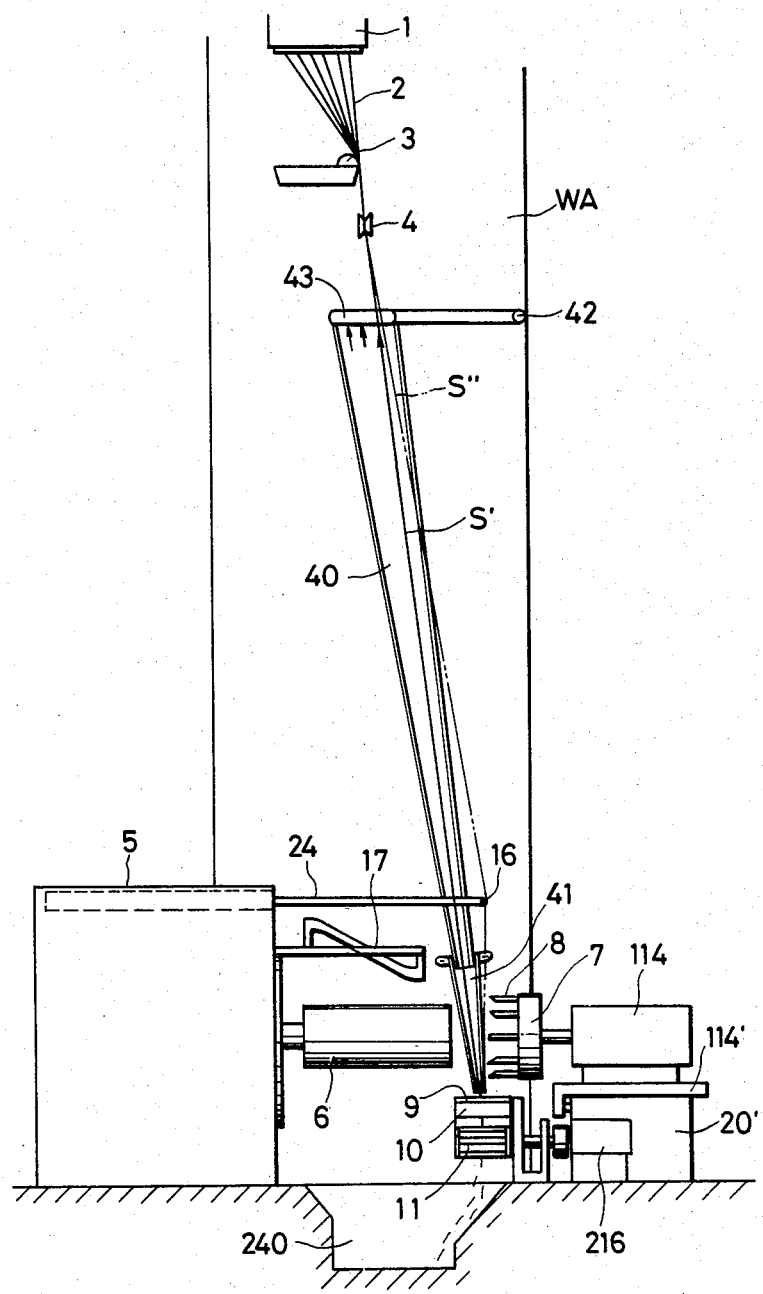
FIG. 16 is a side elevational view of the device of the sixth embodiment.

In FIGS. 15 and 16, a gutter 40 with an open top supports a water ejection tube 43 at its uppermost end and has an upper end located immediately below the collection roller 4 and serving as a receiver of a strand that flows down on spinning. The gutter 40 also has a lower end coupled to a lower gutter 41 supported on a pivotable shaft 46 and having a distal end positionable in the vicinity of an upper face of the strand gripping portion of the pulling and cutting mechanism. The gutters 40 and 41 jointly define a curved path for a flowing fluid.

Designated at WA are partition walls which separate adjacent spinning and winding apparatus by shielding them against mutual interference of spinning atmospheres for stabilized spinning conditions. The gutters 40, 41 and a water feed tube 42 coupled to the water ejection tube 43 are secured to one of such partition walls WA.

The lower gutter 41 is displaceable from the operative position of FIG. 15 to the dot-and-dash-line position of FIG. 15 by turning a rotatable shaft 45 to fold a lever mechanism 44 on itself so that the lower gutter 41 will be positioned out of the way on operation of the apparatus and for maintenance and inspection thereof.

Operation of the device of the foregoing construction according to the sixth embodiment is as follows.

When the collet 6 with an empty bobbin placed thereon is in the winding position as shown at the time of starting of spinnin glass fibers or after a strand being wound has been broken off, the lower gutter 41 is held in the illustrated position by actuation of the rotatable shaft 45, and a valve in the water feed tube 42 is opened to cause water to flow down from the water ejection tube 43. A strand S which has been drawn off from the bushing 1, given sizing agents, and collected together, reaches the upper receiver of the gutter 40 below the gathering roller 4 as shown by the dotted line in FIG. 15, and is fed down on the flowing water along the gutters 40 and 41 to the upper surface of the guide roller 9 of the pulling and cutting mechanism. At this time, the presser roller 10 is spaced from the guide roller 9 by the pressure cylinder 230, and the cutter roller 11 is rotated by the motor 216 with the guide roller 9 rotating in the feed direction. The strand S on the water flow is in contact with the surface of the guide roller 9, and no sufficient tensioning force is applied to the strand S. When the presser roller 10 is pressed against the guide roller 9 by actuation of the pressure cylinder 230 in the opposite direction, the strand S is now gripped and fed along at a speed much greater than the rate at which the strand S flows down on the water flow. Thus, the strand S is quickly tensioned into a strand S' as shown in FIG. 15. At this time, the valve in the water feed tube 42 is closed, and the lever mechanism 44 on the lower gutter 41 is folded on itself in response to turning movement of the rotatable shaft 45 to thereby retract the lower gutter 41 into the dot-and-dash-line position 41'. Upon closing of the valve in the water feed tube 42 and subsequent folding of the lower gutter 41, a strand S'' starts being wound on the auxiliary winder as described below. The strand can be wound even when it is in the position S'''. This is preferable since the pulling and cutting device can sometimes be washed.

Concurrent with the above operation, the strand guide 16 of the winding apparatus 5 is projected by a pressure cylinder to push the strand S' to the position S'', and the mount base 114' of the auxiliary winder is advanced toward the collet 6. When the pegs 8 on the reeling frame 7 exceed the strand S'', the winding drive unit 114 begins to operate to start winding the strand S'' on the reeling frame 7, strand now assuming the position S'''.

During this time, the collet 6 in the winding position is driven to rotate. When the collet 6 and the auxiliary winder reeling frame 7 rotate at a predetermined winding speed, the reeling frame 7 is further advanced to bring the distal ends of the pegs 8 into slightly overlapping relation to the free end of the collet 6, and the strand guide 16 is quickly withdrawn, permitting the strand S''' to be engaged by the wire traversing device 17 which then enables the strand to traverse and be wound on the collet 6.

When the winding of the strand S''' onto the collet 6 has been completed, the auxiliary winder reeling frame 7 is brought to a quick stop to sever the strand. The reeling frame 7 is moved back to a position slightly off the free end of the collet 6. The rotatable table T is turned through 180° to displace the collet 6' with an empty bobbin thereon into the winding position for a next winding cycle and the collet 6 with the fully wound bobbin into the position in which the fully wound bobbin is removed and an empty bobbin is mounted. The preceding cycle of operation is repeated again for spinning and winding glass fibers.

Figure 17:
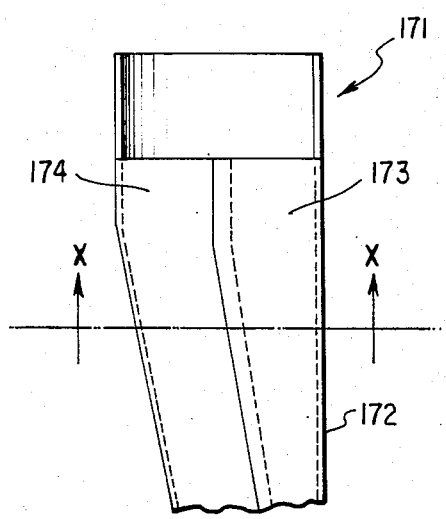
FIG. 17 is a partial side elevational view of a chute having a resiliently closable slit extending over its entire length.
Figure 18:
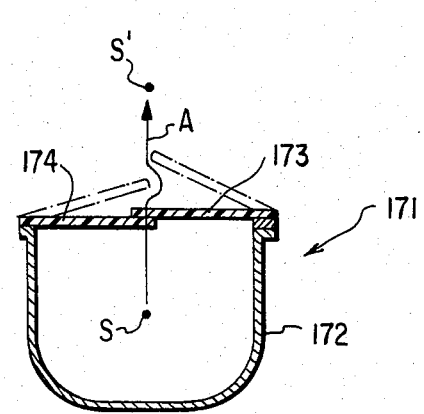
FIG. 18 is a sectional view of a chute having a resiliently closable slit extending over its entire length, taken along line X—X of FIG. 17.

While water has been described as being used as the flowing fluid, a stream of air can also be employed for the flowing fluid. Where air is utilized, it should be supplied in an amount large enough to carry the strand from the strand receiver to the strand discharger on an ejected stream of compressed air. As shown in FIGS. 17 and 18, when the fluid utilized to guide the strand S is air, a fluid flow passage in the form of a tubular body 171 is formed by a chute 172 and a pair of resilient members 173 and 174. The resilient members 173 and 174 form a resilient closable slit extending along the entire length of the chute 172. When the strand S engages the pull roller (not shown) of the strand pulling mechanism (not shown) and is tensioned between the pull roller and the collecting roller (not shown), it will move along the path shown by arrow A, forcing open the resilient members 173 and 174 as shown by the dotted lines, to the position S'.

With the construction of the sixth embodiment, as described above, a strand at the time of starting the spinning thereof can be led reliably to the gripping portion of the strand pulling mechanism below the collet without manual intervention. While the invention has been described as to the specific embodiments, it is apparent that various modifications thereto are possible for those skilled in the art.

We claim:

1. A method of winding a strand of glass fiber filaments on a takeup collet, comprising the steps of:
    (a) guiding an end portion of the strand being drawn off from the spinning bushing, on a stream of fluid, to a strand pulling mechanism;
    (b) automatically engaging said guided strand with said strand pulling mechanism and pulling the strand therewith;
    (c) automatically moving an auxiliary winding mechanism from a standby position to a winding position, and moving said pulled strand into winding engagement with said auxiliary winding mechanism and winding said strand on said auxiliary winding mechanism;
    (d) automatically moving said strand from said auxiliary winding mechanism into winding engagement with an empty takeup collet and winding said strand on said takeup collet and moving said auxiliary winding mechanism back to said standby position;
    (e) winding said strand on said takeup collet until a predetermined amount of said strand is wound on said takeup collet to fill said takeup collet;
    (f) automatically moving said auxiliary winding mechanism from said standby position to said winding position, and moving said strand into winding engagement with said auxiliary winding mechanism and winding said strand on said auxiliary winding mechanism;
    (g) automatically moving said auxiliary winding mechanism back to said standby position, while continuing to wind said strand thereon;
    (h) replacing said filled takeup collet with an empty takeup collect;
    (i) automatically moving said auxiliary winding mechanism from said standby position to said winding position, while continuing to wind said strand thereon;
    repeating steps (d)–(i) sequentially until said strand accidentally breaks and then repeating steps (a)–(i).

2. The method as claimed in claim 1, wherein said stream of fluid is a stream of water.

3. The method as claimed in claim 1, wherein said stream of fluid is a stream of air.

4. The method as claimed in claim 1, wherein said auxiliary winding mechanism moves coaxially with respect to said takeup collet.

5. An apparatus for winding a strand of glass fiber filaments comprising:
    pulling means for drawing a strand of glass fibers from a spinning bushing;
    fluid guide means for automatically guiding an end portion of a strand of glass fibers on a stream of fluid into engagement with said pulling means;
    takeup collet means, having a winding axis, for winding said strand of glass fiber filaments on a bobbin disposed coaxially on said winding axis, said takeup collet means including replacement means for replacing a filled bobbin with an empty bobbin;

auxiliary winding means, coaxially movable along said winding axis between a standby position and a winding position, for windingly receiving said drawn strand from said pulling mechanism, when in said winding position, transferring said strand to and from said bobbin when in said winding position, and continuously winding said strand, when retracted to said standby position, during replacement of the filled bobbin by an empty bobbin;

means for coaxially moving and auxiliary winding means between said standby position and said winding position.

6. An apparatus according to claim 5, wherein said pulling means is disposed below said takeup collet means for pulling the end portion of the strand downwardly.

7. An apparatus according to claim 6, further comprising a fiber filament gathering roller disposed above said takeup collet means for gathering the fiber filaments from the spinning bushing, said pulling means having a strand gripping portion for gripping the end portion of the strand, said fluid guide means including a fluid flow passage having a strand receiver positioned below and adjacent to said strand collection roller for receiving the strand and a strand discharger disposed immediately above said pulling means for discharging the end portion of the strand from said fluid passage, and a fluid eject nozzle disposed above said strand receiver for ejecting the fluid to produce the fluid stream down said fluid passage.

8. An apparatus according to claim 7, wherein said fluid is water, said fluid flow passage comprising a gutter having an open upper side extending throughout its entire length.

9. An apparatus according to claim 7, wherein said fluid is air, said fluid flow passage comprising a tubular body having a resiliently closable slit extending throughout its entire length.

10. An apparatus according to claim 5, further comprising a cutter means disposed below said pulling means for cutting the strand drawn downwardly of said pulling mechanism into chopped strands.

11. An apparatus according to claim 10, wherein said pulling means comprises a guide roller having a resilient surface layer and a press roller movable into and out of contact with said guide roller, said cutter means comprising a cutter roller drivable for rotation about its own axis and having a peripheral surface pressed against a lower peripheral surface of said guide roller and a plurality of cutter blades secured to said peripheral surface.

12. An apparatus according to claim 5, further comprising a strand displacement means, displaceable back and forth, for transferring the strand between said takeup collet means and said auxiliary winding means.

13. An apparatus according to claim 5, wherein said auxiliary winding means comprises a reeling frame disposed in auxiliary confronting relation to a distal end of said bobbin and rotatable coaxially therewith, said reeling frame being axially movable back and forth with respect to said bobbin.

14. An apparatus according to claim 5, wherein said auxiliary winding means comprises a winder frame including a rotatable base and a plurality of spaced members mounted thereon and jointly defining a peripheral surface for winding the strand thereon, strand catchers mounted on and projecting radially outwardly from said members and spaces defined therebetween, and a means for displacing said strand catcher to an end of said winder frame.

15. An apparatus according to claim 14, wherein said winder frame comprises a reeling frame, said members comprising a plurality of pegs supported resiliently on said rotatable base for tilting movement in a direction transverse to an axis of rotation of said rotatable base.

16. An apparatus according to claim 8, wherein said fluid guide means includes an upper stationary gutter and a lower gutter pivotally coupled to said upper stationary gutter.

17. An apparatus according to claim 16, wherein said fluid guide means includes a lever means for positioning and rotating said lower gutter.

18. An apparatus according to claim 7, wherein said flow passage is tapered downwardly to progressively reduce its transverse width.

* * * * *